United States Patent [19]
Dell et al.

[11] 3,912,198
[45] Oct. 14, 1975

[54] TRACKING SYSTEM

[75] Inventors: Charles C. Dell, Grand Prairie; A. D. Harms, Jr., Hurst; Albert B. Knowles, Arlington; Fred D. Meredith, Arlington; Spurgeon Sutherland, Arlington, all of Tex.

[73] Assignee: LTV Aerospace Corporation, Dallas, Tex.

[22] Filed: Nov. 4, 1964

[21] Appl. No.: 409,007

[52] U.S. Cl. ............................................... 244/3.16
[51] Int. Cl. ............................................. F42b 15/02
[58] Field of Search ............ 244/14 H; 250/203 CT; 88/1; 315/11

[56] References Cited
UNITED STATES PATENTS

| | | | |
|---|---|---|---|
| 2,906,916 | 9/1959 | Palmer | 244/14 |
| 3,098,933 | 7/1963 | Barasch | 250/203 |
| 3,149,235 | 9/1964 | Clark | 250/203 |
| 3,240,942 | 3/1966 | Birnbaum et al. | 250/203 |
| 3,258,599 | 6/1966 | Luckerbraun | 250/203 |

*Primary Examiner*—Verlin R. Pendegrass
*Attorney, Agent, or Firm*—H. C. Goldwire; W. j. Jagmin

EXEMPLARY CLAIM

1. A tracking system including: a device having means providing a surface on which light from a predetermined optical field may be focused, said means emitting electrons at each point of said surface in accordance with the intensity of light impinging thereon, an anode, and means for focusing electrons emitted from a small area of said surface on said anode; moving means for continuously changing in a predetermined manner the position of said small area of said surface from which emitted electrons are focussed on said anode; and means and operatively associated with last mentioned means responsive to the intensity of the emitted electrons focussed on said anode for causing the position of said small area to be within a large area of said surface on which impinges light of an intensity different than that of the light impinging on areas of said surface about said large area by causing said moving means to move the position of said small area back into said large area and away from an edge of said large area when said small area tends to move past an edge of said large area.

14 Claims, 6 Drawing Figures

CHARLES C. DELL
A. D. HARMS, JR.
ALBERT B. KNOWLES
FRED D. MEREDITH
SPURGEON SUTHERLAND
INVENTORS

BY *H.C. Goldwire*

AGENT

CHARLES C. DELL
A. D. HARMS, JR.
ALBERT B. KNOWLES
FRED D. MEREDITH
SPURGEON SUTHERLAND
INVENTORS

BY *H.C. Goldwire*

AGENT

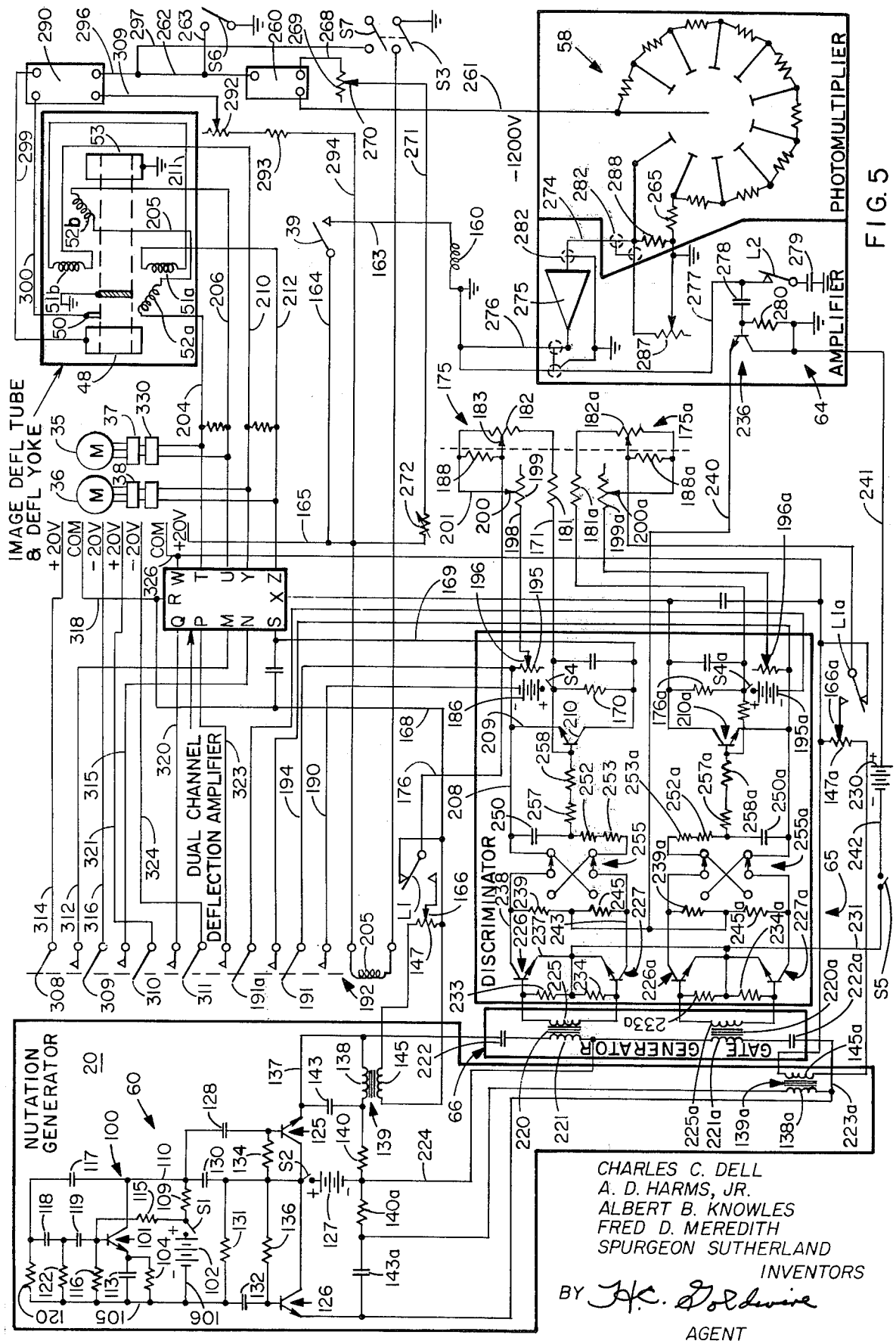

TRACKING SYSTEM

This invention relates to tracking systems and more particularly to a tracking system responsive to the difference in intensities of light reaching the tracking system from a tracked target and from the background behind the target.

An object of this invention is to provide a new and improved tracking system which may be used to track a moving object and guide the movement of a controlled device such as a missile, gun platform, camera platform, sighting platform, vehicles and the like.

Another object is to provide a tracking system which will remain locked on a target regardless of variations in direction and velocity of movement between the tracking system and the target.

Still another object is to provide a tracking system which is maintained or locked on the target by electronic means which permit the tracking system to be maintained or locked on the target even during very rapid changes in the rate and direction of movement of the target relative to the tracking system.

A further object is to provide a tracking system which has means responsive to the difference between the intensity of light reaching the tracking system from a tracked target and from the background behind the target for providing an electric control signal which varies in accordance with the variations in the relative position of the tracking system and the track target, the control signal being employed to keep the tracking system locked on the target and to control operation of a controlled device to maintain a predetermined relation between the target and the controlled device.

A still further object is to provide a tracking system having an image converter or deflection tube provided with a photocathode which emits electrons in accordance with the intensity of light impinging thereon and an anode which emits light in accordance with the intensity of the beam of electrons from the photocathode impinging thereon, the tracking system includng means for focusing light from a predetermined optical field thereon, means operatively associated with the image converter tube for causing the beam of electrons impinging on the anode to emanate from a continuously changing small area of the tube photocathode, and means responsive to the intensity of light emitted by the anode of the image converter tube for causing the beam of electrons to emanate from an area of the photocathode tube on which impinges light from an area of the optical field of a predetermined intensity relationship relative to the light from other areas of the photocathode.

A still further object is to provide a tracking system for tracking a target from which light emanates or is reflected which is of a different intensity, either greater or smaller, than the intensity of light emanating or reflecting from the background of the target, the light from an optical field in which the target is present being focused on a photocathode of an image converter tube which converts the light to an electron beam and focuses the electron beam on an anode which produces a light beam which varies in accordance with the intensity of the electron beam, the tracking system including means responsive to the intensity of the light beam causing the electron beam to emanate from the area of the photocathode on which the image of the target is focused.

Another object is to provide a tracking system for a missile or the like for guiding the flight of the missile to the target, the tracking system being responsive to the difference in intensity of light reflected from the target and its background and providing an electronic control system for operating the flight direction controlling or guiding means of the missile.

Additional objects and advantages of the invention will be readily apparent from the reading of the following description of a device constructed in accordance with the invention, and reference to the accompanying drawings thereof, wherein:

FIG. 5 is a diagrammatic illustration of the electric circuit of the tracking system; and, FIG. 6 is a schematic illustration of the tracking system of a missile and of a launching platform from which the missile may be launched.

Figure 2:
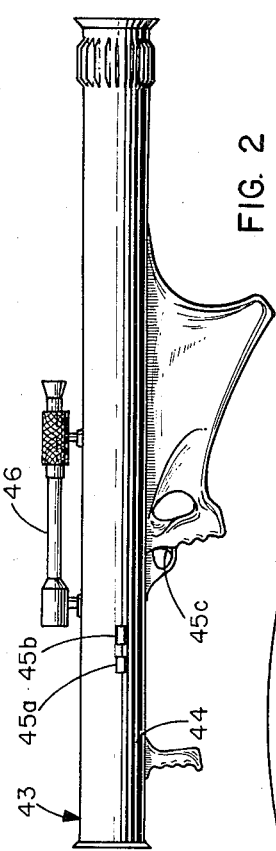
FIG. 2 is a view of a launcher for the missile of FIG. 1.
Figure 1:
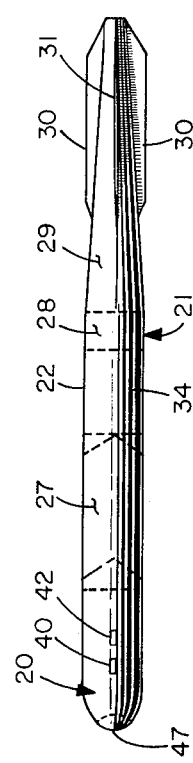
FIG. 1 is a view of a missile provided with a tracking system embodying the invention.

Referring now particularly to FIGS. 1 through 5 of the drawing, the tracking system 20 embodying the invention is illustrated as employed for guiding or controlling the flight of a missile 21 to a target T, such as a tank, to insure that the missile will hit the tank regardless of any evasive movement of the tank after the launching of the missile. The missile includes a substantially tubular housing 22 having a forward section in which the tracking system 20 is housed, an intermediate section containing a shaped charge or explosive 27 for inflicting damage on the target, and a rear motor section in which is housed a solid propellant motor 29. A pair of vanes 30 are mounted on the rear housing section for movement about one axis to guide the flight of the missile in one plane and a pair of vanes 31 are mounted on the rear housing section for movement about another axis to guide the flight of the missile in a second plane perpendicular to the first plane. The mechanism 32 for moving the vanes of the missile is housed in a housing section 28 located forward of the rear housing section and includes servo motors 35 and 36 and servo amplifiers 37 and 38 to which are transmitted electric control signals from the tracking system 20 for controlling the movement of the missile vanes, the servo motor 35 moving the vanes 30 and the servo motor 36 moving the other vanes 31. The lock-on switch 39 of the tracking system has an operator button 40 disposed in a suitable aperture of the forward housing section and the power-on switch with contacts $S_1$ and $S_2$ has a similar operator button 42 disposed in a suitable aperture of the forward housing section.

The launcher 43 includes a hollow barrel 44, a lock-on switch 45a having an inwardly movable operating means for operating the missile lock-on switch operator button 40; and a power-on switch 45b for similarly operating the operator button 42 is in the launcher. The launcher 43 further includes a launch trigger 45c for igniting or initiating the operation of the missile motor 29 and a telescopic sight 46 by means of which the missile may be aimed at a target.

The tracking system 20 includes an objective lens 47 mounted in the forward end of the missile housing which focuses an image of the terrain within a cone, or total optical field A, of approximately 16 degrees in front of the missile on the photocathode 48 of an image converter or deflection tube 49. The image converter tube may be of any suitable type, such as the Type 6381 commercially available from R.C.A. Electron Tube Division, Lancaster, Pennsylvania. The photocathode emits electrons by photoelectric emission in response to the light focused thereon by the objective lens; the intensity of emission of the electrons varies, of course, in accordance with the intensity of the light focused on the photocathode. The tube has a focusing electrode 50, which focuses the electrons emitted by the cathode into a beam B and vertical and horizontal deflection yokes 51 and 52, respectively, which deflect the beam to the anode 53 of the tube. The anode is of smuch smaller area than the photocathode so that the beam of the electrons impinging on the anode may be made to originate from a relatively very small circle lying anywhere within the full circular area of the photocathode, such small circle corresponding to a relatively small portion of and within the total optical field A which is hereafter referred to as operator's field C. The electron beam B, therefore, at any instant is emitted from a very small circle 0 lying within the full area of the photocathode on which light from the small operator's field C, e.g. 4°, impinges. The operator's field C is in the form of a cone whose base is on the target and whose apex is at the objective lens. The phosphor anode 53 converts the electron beam into light which is focused by suitable magnifier optic system 54 upon a detector, such as a photo-multiplier tube 56. The magnifier optic system transmits a beam of light corresponding to only a small portion or area of a target field E within the operator's field and extending along the central axis of the operator's field.

The electron beam B of the image deflection tube is caused to emanate from continuously changing areas of the photocathode by the vertical and horizontal deflection yokes when they are energized by a nutation generator 60. The nutation generator produces two outputs of sine wave form which are applied to the vertical and horizontal deflection yokes 51 and 52 through a suitable dual channel deflection amplifier 61, such as the amplifier designated Model DAPP3 Deflexion Amplifier commercially available from the Constantine Engineering Laboratories Company, Mohwah, New Jersey, to cause the electron beam to sweep around the portion of the photocathode on which is focused the image within the target field.

The field sizes given herein are, of course, provided merely for example and will be understood to vary with factors including the focal length of the objection lens, the quality of the optics and electronics, etc. In general, the fields will be sized to suit the particular application.

The output of the photomultiplier tube is transmitted through a suitable amplifier 64 to a discriminator 65 whose operation is controlled by a gate generator 66. The operation of the gate generator is in turn controlled by the nutation generator 60. The signal from the photomultiplier tube is converted to error signals by the discriminator and transmitted through the dual channel deflection amplifier to the vertical and horizontal deflection yokes of the image deflection tube and to the missile controls 32 in order to keep the tracking system locked on the target and to guide the missile to the target.

If light reflected from the background is of different intensity than the light reflected from the target, any time the target field tends to move upwardly and off the upper edge of the target, the output of the photomultiplier tube changes and the discriminator produces an error signal which is transmitted to the vertical deflection yoke and moves the electron beam upwardly on the photocathode. Simultaneously, the error signals are transmitted to the missile controls 32 to cause the missile direction to be shifted downwardly. Similarly, if the target field tends to move off the lower edge of the target, the error signal is transmitted to the vertical deflection yoke to cause the electron beam to move downwardly and to the missile controls to cause the missile direction to be shifted upwardly. When the target field tends to move off the left edge of the target, the error signal from the discriminator is transmitted to the horizontal yoke 50 of the image deflection tube to cause the electron beam to move to the left on the photocathode and to the missile controls to shift the missile direction to the right. When the target field tends to move off the right edge of the target, the error signal tends to move the electron beam to the right on the photocathode, and the missile controls shift the missile direction to the left. The gate generator and the discriminator thus cause the error signals to be produced from the photomultiplier tube output signal and to be transmitted to the appropriate deflection yokes of the image deflection tube and to the appropriate servo amplifiers of the missile controls to maintain the tracking system locked on the target and to guide the missile to the target. The error signals from the discriminator thus maintain the target field centered on the target and also guide the missile to the target regardless of the movement of the target after the missile has been launched.

Since the tracking system is maintained on target by electronic and not mechanical means, i.e., the means for shifting the electron beam B, even very rapid changes in rate and direction of movement of the target relative to the tracking system will not cause the tracking system to lose the target. The electromechanical means for varying the direction of flight of the missile are controlled by the tracking system and will adjust the direction of flight as required to ensure that the missile reaches the target.

Referring now to FIG. 5 of the drawing, the nutation generator 60 includes an oscillator network 100 having an oscillator transistor 101 whose collector emitter circuit is connected across a suitable source of direct current, such as a battery 102, when the power-on switch with contacts $S_1$ and $S_2$ is closed, its emitter being connected to the negative side of the battery through a resistance 104 and conductors 105 and 106 and its collector being connected to the positive side of the battery through the conductor 110, the resistance 109, and the contact $S_1$ of the power-on switch. A capacitor 113 is connected across the resistance 104. Biasing potential is applied to the base of the oscillator transistor by means of a voltage divider network which includes the resistances 115 and 116 connected in series across the battery, the base being connected to the common connection of the resistances. The base is also connected to a feed-back circuit which includes the capacitors 117, 118 and 119 connected in series between the collector of the oscillator transistor and the base, a resistance 120 connected between the common connection of the capacitors 117 and 118 and the conductor 105, and a resistance 122 connected between the common connection of the capacitors 118 and 119 and the conductor 105. The output of the oscillator transistor is applied to the bases of a pair of transistors 125 and 126, whose emitter collector circuits are connected in parallel across the battery 127 when the power-on switch is closed through its movable contact $S_2$. The base of the transistor 125 is connected to the common connection of the resistance 109 and the emitter of the transistor 101 by the blocking capacitor 128 while the base of the transistor 126 is connected to the common connection of the resistance 109 and the emitter of the transistor 101 through the capacitor 130, the resistance 131 and the capacitor 132. Biasing potential is applied to the base of the transistor 125 through the resistance 134 and to the base of the transistor 126 through the resistance 136. The emitter collector circuit of the transistor 125 is connected across the source of direct or battery current 127, its emitter being connected to the negative side of the source through the conductor 137, the primary winding 138 of an output transformer 139 and the resistance 140 while its collector is connected to the positive side of the battery through the switch contact $S_2$. A capacitor 143 is connected across the primary winding.

The secondary winding 145 of the output transformer 139 has a resistance 147 connected across it by means of which the output of the voltage induced in the secondary winding is employed to control the energization of the coils 52a and 52b of the horizontal deflection yoke 52 of the image deflection tube. The input terminals R and S of one channel of the dual channel amplifier 61, across whose output terminals T and U the coils 52a and 52b of the horizontal deflection yoke are connected, are energized by the voltage induced in the secondary winding 145 of the transformer 139 of the nutation generator when the lock-on switch 39 is closed and connects the lock-on relay coil 160 across a suitable source of direct current. When the lock-on switch is closed, one side of the relay coil is connected to a source or input circuit of direct current, such as a battery, through ground and its other side is connected to the other side of the source through the conductor 163, the switch 39 and the conductors 164 and 165. The relay coil 160, when energized, moves its relay contact $L_1$ to its lowermost position to connect it to the movable contact 166 of the resistance 147. The input terminal R is connected to one side of the resistance 147 through the conductor 168. The other input terminal S is connected to the adjustable contact 166 of the resistance 147 by the conductor 169, the resistance 170, the conductor 171, the adjusting resistance network 175 and the conductor 176. The deflection centering adjustment network 175 includes the serially connected resistances 181 and 182. One side of the resistance 181 is connected to the conductor 171 and its other side is connected to one side of the resistance 182. The adjustable contact 183 of the resistance 182 is connected to the conductor 176. A biasing voltage is applied across the resistances 181 and 182 from a battery 186, one side of which is connected to the conductor 171 through the contact $S_4$ of the power-on switch and whose other side is connected to the common connection of the resistances 182 and 188 by the conductor 190, the contact 191 of the power-on relay 192, the conductor 194, the resistance 195 and its adjustable contact 196, the conductor 198, the resistance 199 and its adjustable contact 200 which is connected to the common connection of the resistances 182 and 188 by the conductor 201. The resistance 188 is connected between the conductor 176 and a common connection of the resistances 182 and 188.

It will thus be apparent that when the power-on switch is closed and the lock-on switch is open, a biasing potential is applied across the input terminals R and S of one channel of the dual channel amplifier 61, the output terminals T and U of this channel having the coils 52a and 52b connected thereacross by means of the conductors 204, 205 and 206, and that the biasing potential may be varied as required for initial centering of the electron beam by moving the contacts 183, 196 and 200 on the resistances 182, 195 and 199, respectively.

When the lock-on switch 39 is closed and the contact $L_1$ is moved to its lower position, one sine wave output of the nutation generator induced in the secondary winding 145 of its output transformer 139 is applied across the input terminals R and S since one side of the resistance 147 is connected to the terminal R by the conductor 168 and the contact 166 is then connected to the terminal S through the contact $L_1$, the conductor 176, the resistance 188, the conductor 201, the contact 200 and resistance 199, the conductor 198, the contact 196 and the resistance 195, the conductors 208 and 209, the emitter collector circuit of a transistor 210 and the conductor 169. The conductivity of the transistor 210 as will be explained below varies in accordance with the output of the photomultiplier tube.

The sine wave output of the transistor 126 and a biasing potential are selectively applied across the input terminals W and X of the other channel of the dual channel amplifier 61, across whose output terminals Y and Z, the coils 51a and 51b of the vertical deflection yoke are connected by means of the conductors 210, 211 and 212, by a circuit identical to that by which the output of the transistor 125 and a biasing potential are selectively applied across the terminals R and S, and, accordingly, the elements of this circuit have been supplied with the same reference numerals, to which the subscript "a" has been added as the corresponding elements of such circuit connected to the input terminals R and S.

The gate generator 66 includes a transformer 220 whose primary winding 221 has one side connected through a blocking capacitor 222 and the conductor 137 to the emitter of the transistor 125 and its other side to the collector of the transistor through the conductor 224, the battery 127, the power switch contact $S_2$.

Opposite sides of the secondary winding 225 of the transformer 220 are connected to the bases of the two transistors 226 and 227 of the discriminator 65 which are alternately conductive during alternate half cycles of the output of the transistor 125 of the nutation generator. The bases of the transistors 226 and 227 are connected to the negative side of a battery or source of current 230 through a conductor 231 and the resistances 233 and 234. The emitter collector circuit of the transistor 226 is connected in series with the emitter circuit of the transistor 236 of the amplifier 64 by the conductors 231, 237 and 238, resistance 239, the conductors 240, 241 and 242, and the contact $S_5$ of the power-on switch. The emitter collector circuit of the other transistor 227 is similarly connected in series with the emitter collector circuit of the output amplifier transistor 236 by the conductors 231, 237 and 243, the resistance 245, the conductors 240, 241 and 242 and the power-on switch contact S$_5$.

The conductivity of the transistor 210 varies in accordance with the charge accumulated across the capacitor 250 which is connected in series with the resistances 252 and 253 across the resistances 239 and 245 by means of a reversing switch 255. The common connection of the resistance 252 and one side of the capacitor 250 is connected to the base of the transistor 210 by the resistances 257 and 258. The emitter of the transistor 210 is connected to the other side of the capacitor 250 by the conductors 209 and 208. The reversing switch reverses the polarity of charge of the capacitor 250 in order that the conductivity of the transistor 210 may be caused to vary directly or inversely, as required for tracking a dark target or light target, respectively. The gate generator includes a second transformer 220$a$ one side of whose primary winding 221$a$ is connected to the emitter of the transistor 126 of the nutation generator through a blocking capacitor 222$a$ in the conductor 223$a$ and whose other side is connected to its collector through the conductor 224, the battery 127 and the power-on switch contact S$_2$.

The circuit between the transistor 210$a$ which controls the signal input across the input terminals W and X of the other channel of the dual channel amplifier and the secondary winding 225$a$ of the transformer 220$a$ is identical to the circuit between the secondary winding 225 and the transistor 210 and, accordingly, its elements have been provided with the same reference numerals, to which the subscript "$a$" has been added, as the corresponding elements of the circuit between the secondary winding 225 and the transistor 210. The conductivity of the two transistors 210 and 210a varies in accordance with the output or conductivity of the emitter collector circuit of the amplifier transistor 236 which amplifier the output of the photomultiplier tube.

The photomultiplier tube 58 is supplied with a high negative input voltage by a suitable power supply 260 one side of whose output circuit is connected to the cathode of the multiplier tube through a conductor 261 and whose other side is connected to the anodes of the photomultiplier tube through the conductors 262 and 263, the contact S$_6$ of the power-on switch, ground and the resistance 265. One side of the input circuit of the power supply 260 is connected to the positive side of an input circuit of positive voltage by the conductor 268, the variable resistance 269 and its adjustable contact 270, the conductor 271, the variable resistance 272 and the conductor 165 while its other side is connected to the other side of the input circuit through the conductors 262 and 263, the power-on switch contact S$_6$ and ground.

The output of the photomultiplier tube is connected through the conductor 274 and amplifier 275, the conductors 276 and 277 and the blocking capacitor 278 to the base of the amplifying transistor 236 when the lock-on relay contact L$_2$ which, when in its closed position connects the conductor 277 to ground through the capacitor 279, is open. A resistance 280 is connected between ground and the common connection of capacitor 278 and the base of the amplifier transistor 236. The amplifier 275 may be of any suitable type such as the amplifier commercially available under the name "Tektronix 123".

Suitable shields 282 may be provided about the various conductors by which the output of the photomultiplier tube is transmitted to the amplifier transistor 236. An output adjusting circuit includes the variable resistance 287 connected across the output resistance 288 of the photomultiplier tube.

The power supply 290 for supplying necessary high negative voltage to the image converter or deflection tube 49 has an input circuit one side of which is connected to the positive side of an input circuit of low positive voltage through the conductor 291, variable resistance 292, the resistance 293 and the conductors 294 and 165. The other side of the input circuit of the power supply 290 is connected to the other side of this input circuit through the conductors 296 and 297, the contact S$_7$ of the power-on switch and ground. The power supply 290 supplies a high negative voltage, for example, 12,000 volts, to the cathode 48 of the image deflection tube by means of the conductor 299 and a high negative voltage, for example, 10,000 volts, to the focusing grid through the conductor 300. The other sides of the output circuits of the power supply 290 are grounded and are thus connected to the ground strap 302 of the photomultiplier tube and the anode 53 when the power-on switch is in its closed position.

Negative and positive power voltages are supplied to the two channels of the dual channel amplifier through the contacts 308, 309, 310 and 311 of the power-on relay when its coil 205 is energized. One terminal M of the power input circuit of one channel of the dual channel amplifier is connected to the positive side of an input circuit of positive voltage through the conductor 312, the power-on relay contact 308 and the conductor 314, another terminal N thereof is connected to the negative side of an input circuit of negative voltage through the conductor 315, the contact 309 and the conductor 316, and the common terminal thereof is connected to the common side of the two input circuits of positive and negative voltage by the conductor 318 which is connected to the terminal R. One terminal O of the power input circuit of the other channel is connected to the positive side of a power input circuit through the conductor 320, the contact 310 and the conductor 321 while another terminal P thereof is connected to the negative side of the power input circuit through the conductor 323, the contact 311 and the conductor 324 and the common terminal W of the power input circuit of this other channel is connected to the common terminal of these input circuits of positive and negative voltage by the conductor 326.

The electric motor 35 which controls the position of the vanes 30 of the rocket is energized by the output of one channel of the dual channel amplifier, its amplifier 37 being connected across the conductors 204 and 206 through a suitable filter 330 which filters out the sine wave frequency while the servo amplifier 38 of the motor 36 which moves the vanes 31 of the rocket is connected across the conductors 210 and 212 through a suitable filter 331 which filters out the sine wave frequency.

Figure 3:
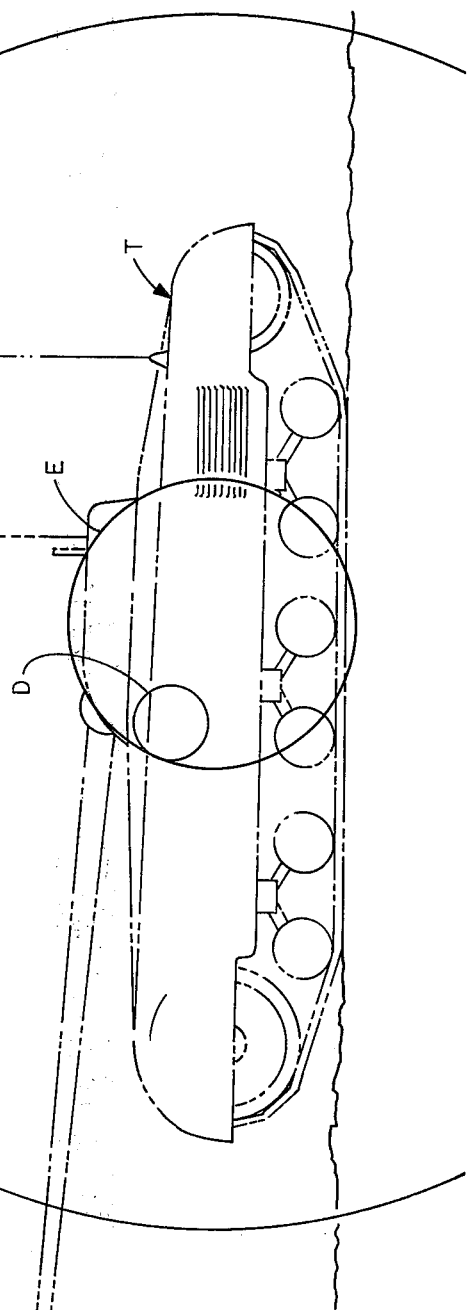
FIG. 3 is a schematic illustration of the manner in which light reflected or emanating from the target is utilized to control the flight of the missile.

In use, when the missile 21 is to be launched to strike a target such as the tank T, the missile is inserted into the barrel of the launcher 43. The adjustable contacts 183, 196 and 200 were previously positioned on their respective resistances 182, 195 and 199 to cause the beam B, when the lock-on switch is not closed, to be properly aligned and parallel with the line of sight of the telescopic sight 46 so that when the target is properly centered within the field of view of the telescopic sight, the image of the target is properly focused and centered on the photocathode. The field of view of the telescopic sight is the operator's field C as illustrated in FIG. 3. The power-on switch 45b of the launcher is then actuated to actuate the button 42 of the power-on switch and its contacts $S_{1-7}$ are closed. The coil of the power-on relay 192 is then energized causing its contacts to move to their closed positions and appropriate voltages to be supplied to the image deflection tube, to the photomultiplier tube, the dual channel amplifier and the nutation generator. Since the lock-on switch is still open, the output of the photomultiplier tube is now shunted by means of the lock-on relay contact $L_2$ which is now in its closed position, and does not now therefore control the conductivity of the control transistors 210 and 210a. The output of the nutation generator similarly is now not applied to the two input circuits of the dual channel amplifier 61 since the lock-on contacts $L_1$ and $L_{1a}$ are now in the positions illustrated in FIG. 5. The electron beam B now therefore extends parallel to the line of sight of the telescopic sight and is not moving over or scanning the photocathode.

The operator now centers the target in the telescopic sight and thus aims the missile directly at the target. The operator then actuates the lock-on switch 45a of the launcher and thus actuates the operator button 40 of the missile and closes the lock-on switch 39. When the lock-on switch is closed, the relay winding 160 is energized and the contacts $L_1$ and $L_{1a}$ are moved to the positions wherein they are connected to the adjustable contacts 166 and 166a and simultaneously the contact $L_2$ moves to its open position. The two quadrature sine wave outputs of the nutation generator are now applied across the primary windings 221 and 221a of the transformers 220 and 220a of the gate generator 66 and now cause the capacitors 250 and 250a to be charged in accordance with the output of the photomultiplier tube which is now transmitted through the amplifier transistor 236 to the capacitors 250 and 250a. The gate generator periodically reverses the output of the photomultiplier tube across the capacitors 250 and 250a as the transistors 226 and 227 and the transistors 226a and 227a of the discriminator are alternately and periodically rendered conductive in synchronism with the two outputs of the nutation generator and therefore in accordance with the location of the electron beam on the image of the target on the photocathode.

The direct current signals across capacitors 250 and 250a, whose magnitudes and polarities vary in accordance with the amplitude and phase of the output of the photomultiplier tube, being transmitted respectively through transistors 210 and 210a to input terminals R–S and W–X of the dual channel deflection amplifier, cause the electron beam B, when it is tending to move off the target image in any direction, to be shifted in the opposite direction.

In this manner, the circuit of the tracking system causes the beam to emanate from the area of the photocathode on which the image of the target is focused while simultaneously the beam is caused to move continuously over or scan the image of the target on the photocathode.

The shifting of the electronic beam as it is thus maintained or locked on the image of the target on the photocathode tube, is of course instantaneous so that the tracking system remains locked on the target even though the slower mechanical drive or control means of the vertical and horizontal vanes 30 and 31 of the missile can not instantaneously change the direction of flight of the missile. The image of the target can shift over the relatively large total optical field A of the objective lens without causing the image to move off the photocathode which would, of course, cause the target to be lost. The energization of the servo motors 35 and 36 which move the missile guide vanes varies as the energization of the vertical and horizontal deflection yokes except that the sine wave frequency in the outputs of the two channels of the dual channel amplifier are filtered out, to cause the missile to remain aimed at the target even though some lag is present between the change of direction of the flight of the missile and the change of direction of movement of the target relative to the missile.

It will, of course, be apparent that the reversing switches 255 and 255a are placed in one operative position when the target is darker or has less light reflected therefrom than its background and that they are placed in their opposite positions when the target is lighter or has more light reflected therefrom than its background.

It will now be apparent that while the tracking system has been described in connection with a missile for controlling its flight to a target, the tracking system may be used to control the position or movement of other devices relative to a target or object, for example, the tracking system may be used to control a powered camera platform or a gun platform to hold the camera or gun properly aimed at an object, for example, a missile, airplane or other target, even though the camera or gun platform is mounted on a moving vehicle such as an airplane or ship and the target itself is moving.

It will also be apparent that the tracking system of the invention may be employed in range finding systems to determine by triangulation the range, and if necessary the velocity and direction of movement of an object. In such systems two of the tracking systems are employed and are mounted on suitable powered platforms. The output signals of the two tracking systems are employed to control the movement of such platforms to keep the tracking systems locked on such objects. The output signals may be recorded on suitable charts driven at a constant or timed rate of subsequent calculation or the range or direction and velocity of movement of such objects, such as missiles, or may be transmitted to a suitable computer which may calculate continuously the range, direction and velocity of movement of such objects.

It will also be seen that if the range of movement of a target is within the total optical field A, the tracking system could be held stationary and the location of the target, and its direction and velocity of movement, would be indicated by the variations in the amplitudes of the outputs of the two channels of the dual channel amplifier.

It will also be seen that while the tracking system has been described in connection with the tracking of a target by means of the light reflected from the target of different intensity than the light, reflected from the background, if desired, the target could be illuminated with light or radiation of a predetermined frequency and the objective lens system would then be provided with a suitable filter which would transmit only such light or radiation of the predetermined frequency to the photocathode.

Figure 6:
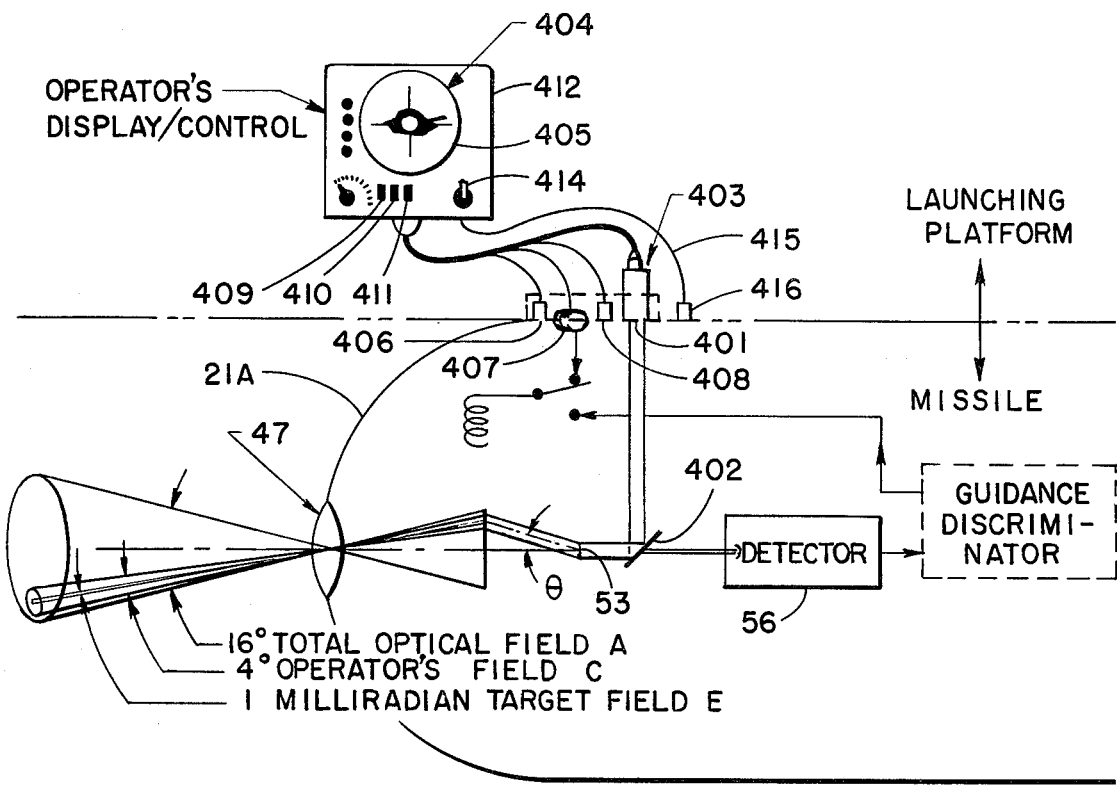
Figure 4:
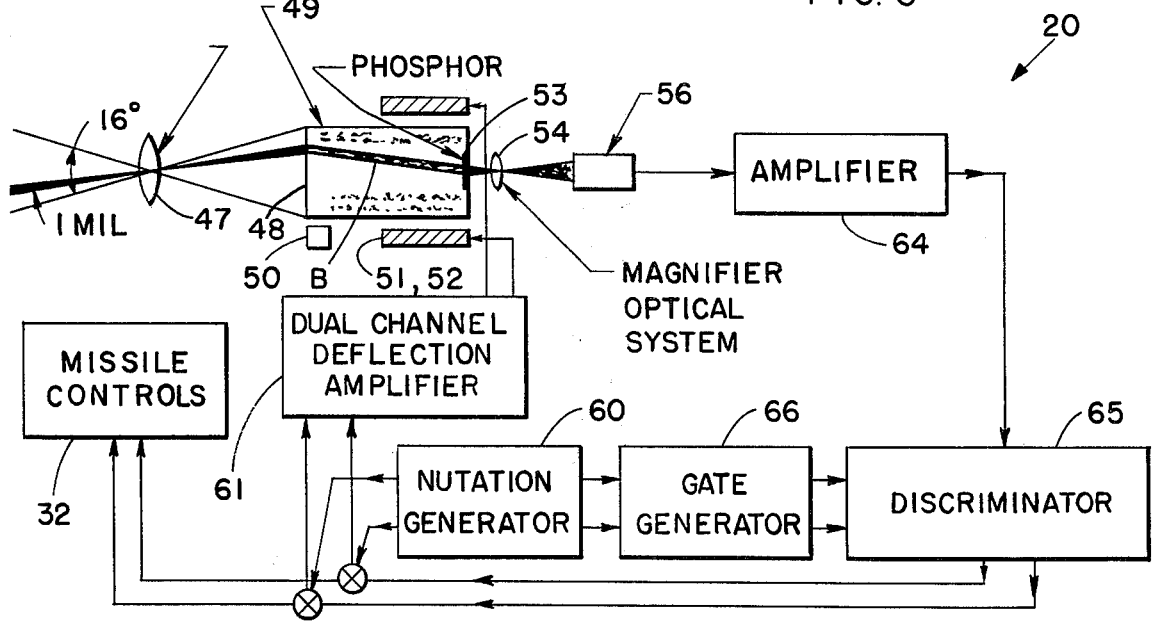
FIG. 4 is a schematic and block diagram of the tracking system.

Referring now to FIG. 6 of the drawing, a missile 21a provided with a tracking system of the invention is shown mounted for firing from a launching platform such as a vehicle, a tank, helicopter, airplane, ship or the like, wherein the operator is of necessity positioned at a location remote from the missile and the operation of the missile must be by remote control. The missile is releasably secured to such launching platform in any usual suitable manner and is provided with a suitable window 401 through which the image on a mirror 402 may be reflected to a Vidicon tube 403. The reflecting mirror is positioned between the anode 53 of the photocathode tube and the photomultiplier tube 56 and has an aperture through which a beam of light emitted by the anode 53 corresponding to the beam B reflected from the target is transmitted to the photomultiplier tube. The Vidicon tube is connected to a television device which includes a picture tube 404 on whose screen 405 is projected an image corresponding to the image reflected to the Vidicon tube by the mirror. Suitable electrically operable means 406, 407 and 408, such as solenoids, are mounted on the lauching platform for actuating the power-on button 42, the lock-on button 40 and the firing or trigger mechanism of the missile, respectively. The electrically operable means 406, 407 and 408 are operated by the switches 409, 410 and 411, respectively, mounted on a control panel 412.

the resistances 182 and 182a and their adjustable contacts 183 and 183a are mounted on such panel and the adjustable contacts are individually movable by means of the stick grip 414. These resistances and their adjustable contacts are connected to the resistance networks 175 and 175a by a suitable cable 415 and a disconnect plug 416. Since such launching platform can not in every instance be readily aimed at a target, the operator after he has actuated the switch 409 to actuate the power-on switch of the tracking system, adjusts the location from which the electron beam B emanates by varying the position of the adjustable contacts 182 and 182a by means of the stick grip until the target is centered on the screen 405 and then actuates the switch 410 to cause the lock-on switch to close. The tracking system is now locked on the target and the operator actuates the switch 409 to fire the missile. As the missile drops or moves away from the launching platform, the cable 415 and its plug 416 are disconnected from the missile.

It will thus be apparent that the tracking system may by operated from a remote location by any suitable remote control means such as that illustrated in FIG. 6.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A tracking system including: a device having means providing a surface on which light from a predetermined optical field may be focused, said means emitting electrons at each point of said surface in accordance with the intensity of light impinging thereon, an anode, and means for focusing electrons emitted from a small area of said surface on said anode; moving means for continuously changing in a predetermined manner the position of said small area of said surface from which emitted electrons are focussed on said anode; and means and operatively associated with last mentioned means responsive to the intensity of the emitted electrons focussed on said anode for causing the position of said small area to be within a large area of said surface on which impinges light of an intensity different than that of the light impinging on areas of said surface about said large area by causing said moving means to move the position of said small area back into said large area and away from an edge of said large area when said small area tends to move past an edge of said large area.

2. A tracking system including: a device having means providing a surface on which light from a predetermined optical field may be focused, said means emitting electrons from each point of said surface in accordance with the intensity of light impinging thereon, an anode, and means for focusing electrons emitted from a small area of siad surface on said anode; moving means for continuously changing the position of said small area area of said surface; and means operatively associated with said last mentioned means responsive to the intensity of the electrons focussed on said anode for causing the position of said small area to be within a large area of said surface on which impinges light of an intensity different than that of the light impinging on areas of said surface about said large area by causing said moving means to move the position of said small area back into said large area and away from an edge of said large area when said small area tends to move past an edge of said large area; a movable controlled device; and means operatively associated with said last mentioned means for controlling movement of said controlled device in accordance with the position of said small area on said surface.

3. A tracking system including: a device having means providing a surface on which light from a predetermined optical field may be focused; means for focusing an image of a target within said optical field on said surface, said means of said device providing said surface emitting electrons from each point of said surface in accordance with the intensity of light impinging thereon, and anode, and means for focusing electrons emitted from a small area of said surface on said anode; moving means for continuously changing the position of said small area; and means operatively associated with said last mentioned means responsive to the intensity of the electrons focussed on said anode for causing said small area to be positioned and moved within a large area of the said surface on which the image of a target is focused by causing said moving means to move the position of said small area back into said large area and away from an edge of said large area when said small area tends to move past an edge of said large area.

4. A tracking system including: a device having means providing a surface on which light from a predetermined optical field may be focused; means for focusing an image of a target within said optical field on said surface, said means of said device providing a surface emitting electrons from each point of said surface in accordance with the intensity of light impinging thereon, an anode, and means for focusing electrons emitted from a small area of said surface on said anode; moving means for continuously changing the position of said small area of said surface; means operatively associated with said last mentioned means responsive to the intensity of the electrons focussed on said anode for causing the position of said small area to move within a large area of said surface on which the image of the target is focused by causing said moving means to move the position of said small area back into said large area and away from an edge of said large area when said small area tends to move past an edge of said large area; a movable controlled device; and means operatively associated with said said last mentioned means for controlling movement of said controlled device in accordance with the position of the image of the target on said surface.

5. A tracking system for a controlled device having guidance means for guiding its movement, said tracking system including: an image converter tube having a photocathode having a surface on which light from a predetermined optical field may be focused, said photocathode emitting electrons at each point of said surface in accordance with the intensity of light impinging thereon, an anode and means for focusing electrons emitted from a small area of said photocathode on said anode, said anode emitting light in accordance with the intensity of the electron beam; detector means for providing an output which varies in accordance with the intensity of light emitted by said anode; moving means for continuously changing the position of said small area; and control means operatively associated with said moving means and responsive to said output of said detector means for causing the position of said small area to move in a predetermined manner over said photocathode within a large area thereof on which is projected an image of a light intensity different than the intensity of light impinging on other areas of said photocathode by moving the position of said small area back into said large area and away from an edge of said large area when said small area tends to move past an edge of said large area and for controlling the guidance means of the controlled device in accordance with the position of said small area on said photocathode.

6. A tracking system for a controlled device having guidance means for guiding its movement, said tracking system including: an image converter tube having a photocathode having a surface on which light from a predetermined optical field may be focused, said photocathode emitting electrons from each point of said surface in accordance with the intensity of light impinging thereon, an anode and means for focusing electrons emitted from a small area of said surface of said photocathode on said anode, said anode emitting light in accordance with the intensity of the electrons focussed thereon; detector means for providing an output which varies in accordance with the intensity of light emitted by said anode; control means responsive to said output of said detector means for causing the position of said small area to be moved in a predetermined manner over said surface of said photocathode within a large area thereof on which is projected an image of a light intensity different than the intensity impinging on other areas of said photocathode by moving the position of said small area back onto said large area and away from an edge of said large area when said small area tends to move past an edge of said large area and for controlling the guidance means of the controlled device; first means for energizing said image converter tube and said detector means; and second means for energizing said control means.

7. A tracking system for a controlled device having guidance means for guiding its movement, said tracking system including: an image converter tube having a photocathode having a surface on which light from a predetermined optical field may be focused, said photocathode emitting electrons from each point of said surface in accordance with the intensity of light impinging thereon, an anode and means for focusing electrons emitted from a small area of said surface of said photocathode on said anode, said anode emitting light in accordance with the intensity of the electrons focussed thereon; detector means for providing an output which varies in accordance with the intensity of light emitted by said anode; control means responsive to said output of said detector means for causing said small area to be moved in a predetermined manner over said surface of said photocathode within a large area thereof on which is projected an image of a light intensity different than the intensity of light impinging other areas of said photocathode by moving the position of said small area back into said large area and away from an edge of said large area when said small area tends to move past an edge of said large area and for controlling the guidance means of the controlled device; first means for energizing said image converter tube and said detector means; means operable when said image converter tube and said detector means are energized for selectively varying the location of said small area on said surface of said photocathode to permit the position of said small area to be moved within said large area before said control means is energized; and means for energizing said control means.

8. A tracking system for a controlled device having means for guiding its movement, said tracking system including: an image converter tube having a photocathode having a surface on which light from a predetermined optical field may be focused, said photocathode emitting electrons from each point of said surface in accordance with the intensity of light impinging thereon, an anode, means for focusing electrons emitted from a small area of said surface of said photocathode on said anode, said anode emitting light in accordance with the intensity of the electrons focussed thereon, and moving means for causing the position of said small area to move over said surface of said photocathode; detector means responsive to light emitted by said anode and providing an output which varies in accordance with the intensity of light emitted by said anode; and control means responsive to the output of said detector means providing an output for controlling said beam moving means to cause said small area to move in a predetermined manner over said photocathode within a large area thereof on which is projected light of an intensity different than the light intensity impinging on other areas of said photocathode by causing said moving means to move the position of said small area back into said large area and away from an edge of said large area when said small area tends to move past an edge of said large area and for causing the guiding means of a controlled device to guide its movement in accordance with the location of said small area on said surface of said photocathode.

9. A tracking system for a missile having means for guiding its movement, said tracking system including:

an optical system mounted at the front end of said missile; an image converter tube having a photocathode having a surface on which light may be focused, said photocathode emitting electrons from each point of said surface in accordance with the intensity of light impinging thereon, an anode, means for focusing electrons emitted from a small area of said surface on said area said anode, and moving means for and controlling the position of said small area on said surface of said photocathode, said anode emitting light in accordance with the intensity of said electron beam, said optical system projecting an image within a predetermined optical field in front of said missile on said surface of said photocathode; detector means responsive to the light emitted by said anode providing an electric output which varies in accordance with the intensity of light emitted by said anode; and control means responsive to the output of said detector means and operatively associated with said moving means for causing said small area to move in a predetermined manner over said surface of said photocathode within an area thereof on which is projected an image of a target within the optical field by causing said moving means to move the position of said small area back into said large area and away from an edge of said large area when said small area tends to move past an edge of said large area and for causing said guidance means to maintain the missile aimed at the target during its flight.

10. A tracking system for a controlled device having means for guiding its movement, said tracking system including: an image converter tube having a photocathode having a surface on which light may be focused, said photocathode emitting electrons from each point of said surface in accordance with the intensity of light impinging thereon, an anode, means for focusing electrons emitted from a small area of said surfaces of said photocathode on said anode, said anode emitting light in accordance with the intensity of the electrons focussed thereon, and moving means for moving said small area over said surface of said photocathode; detector means responsive to light emitted by said anode and providing an output which varies in accordance with the intensity of light emitted by said anode; control means responsive to the output of said detector means providing an output for controlling said moving means to cause said small area to move in a predetermined manner over said surface of said photocathode within a large area thereof on which is projected light of an intensity different than the light intensity impinging on other areas of said photocathode by causing said moving means to move the position of said small area back into said large area and away from an edge of said large area when said small area tends to move past an edge of said large area and for causing the guiding means of a controlled device to guide its movement in accordance with the location of said large area on said surface of said photocathode; first means for energizing said image converter tube; and second means for energizing said control means.

11. A tracking system for a missile having means for guiding its movement, said tracking system including: an optical system mounted at the front end of said missile; an image converter having a photocathode having a surface, said photocathode emitting electrons from each point of said surface in accordance with the intensity of light impinging thereon, an anode, means for focusing electrons emitted from a small area of said surface of said photocathode said anode, and moving means on operatively associated with said last mentioned means for varying the position of said small area of said surface of said photocathode, said anode emitting light in accordance with the intensity of the electrons focussed thereon, said optical system projecting an image within a predetermined optical field in front of said missile on said photocathode; detector means responsive to the light emitted by said anode providing an output which varies in accordance with the intensity of light emitted by said anode; and control means responsive to the output of said detector means and operatively associated with said moving means for causing said small area to move in a predetermined manner over said surface of said photocathode within a large area thereof on which is projected an image of a target within the optical field by causing said moving means to move the position of said small area back into said large area and away from an edge of said large area when said small area tends to move past an edge of said large area and for causing said guidance means to maintain the missile aimed at the target during its flight; first means for energizing said image converter tube and said detector means; means operable when said image converter tube and said detector means are energized for varying the location of small area of said surface of said photocathode; and means for energizing said control means after said small area has been positioned by means of said last mentioned means within said large area on which the image of a target is focused.

12. The tracking system of claim 1, wherein said tracking system includes first means for energizing said means for focusing electrons, second means for energizing said moving means, and target acquisition means for causing the position of said small area to be within said large area prior to the operation of said second means.

13. The tracking system of claim 4, wherein said tracking system includes first means for energizing said means for focusing electrons, second means for energizing said moving means, and target acquisition means for causing the position of said small area to be within said large area prior to the operation of said second means.

14. The tracking system of claim 13, wherein said target acquisition means includes means for selectively moving said beam to vary the position of said small area on said surface without moving said device.

* * * * *